United States Patent [19]

Stull et al.

[11] 4,264,061
[45] Apr. 28, 1981

[54] PNEUMATIC SEALS FOR HOT METAL FURNACE ENCLOSURE

[75] Inventors: James T. Stull, Jackson Township, Butler County, Pa.; Robert V. McCabe, Waxahachie, Tex.

[73] Assignee: United States Steel Corporation, Pittsburgh, Pa.

[21] Appl. No.: 37,977

[22] Filed: May 10, 1979

[51] Int. Cl.³ .......................... C21C 5/38; C21C 5/46
[52] U.S. Cl. .................................. 266/158; 98/115 R
[58] Field of Search .............. 266/144, 156, 158, 216, 266/217; 75/60; 432/242; 110/173 R, 175 R; 98/115 R, 115 VM; 34/242

[56] References Cited

U.S. PATENT DOCUMENTS

| 3,623,714 | 11/1971 | Firmin | 34/242 |
| 3,724,827 | 4/1973 | Dortenzo | 266/158 |
| 4,054,411 | 10/1977 | Beck | 34/242 |
| 4,097,029 | 6/1978 | Ziegler | 266/158 |
| 4,111,405 | 9/1978 | Krelis et al. | 266/158 |
| 4,168,824 | 9/1979 | Nagati | 266/158 |

FOREIGN PATENT DOCUMENTS

| 1149847 | 6/1963 | Fed. Rep. of Germany | 110/173 R |
| 2115559 | 7/1972 | France | 432/242 |

*Primary Examiner*—Michael L. Lewis
*Attorney, Agent, or Firm*—John F. Carney

[57] ABSTRACT

Pneumatic seals are provided at the seams about movable doors of the containment enclosure for a metal processing converter to prevent leakage of undesirable effluent to the atmosphere. The seals incorporate members on the doors and the adjacent enclosure structure which, when the doors are closed, define labyrinth passages for conducting clean air from an elevated pressure source to discharge simultaneously into the enclosure interior and to the atmosphere. The invention contemplates, as an alternative, connection of the passages to a low pressure source effective to withdraw the effluent leakage for discharge into a receiver.

6 Claims, 4 Drawing Figures

PNEUMATIC SEALS FOR HOT METAL FURNACE ENCLOSURE

BACKGROUND OF THE INVENTION

The present invention relates to improvements in metal refining converter installations. Such installations, especially those incorporating open-topped vessels that are pivotable about a horizontal axis between positions of charging, refining, and pouring, require the vessel to be surrounded by a gas-containment enclosure in order to prevent the escape of high temperature effluent gases and other materials to the atmosphere. Such enclosures must be provided with access openings to enable the converter vessel to be charged with scrap metal and/or molten pig iron. In practice, these openings are covered by large movable panels or doors which, after a period of use, become deformed as a result of thermally induced warpage or as a result of physical damage thereby destroying the effectiveness of the seals and, thus, enabling effluent to leak to the atmosphere.

Gas enclosure structures of the type in question which include movable panels to cover access openings to the converter are as described in U.S. Pat. No. 4,076,223 to E. G. Schempp.

Ideally an effective gas seal could be obtained between the panels and the adjacent enclosure structure by tight metal-to-metal contact between the members; however, in practice this form of gas seal is totally impractical in the concerned environment due to the inability to keep the mating seal surfaces free from particulates and also due to the fact that after prolonged use the panels and adjacent enclosure wall structure become deformed due to thermally induced warpage and physical damage so as to destroy any effective seal that may originally have existed between the mating seal surfaces.

It has been contemplated to employ water or sand seals about the seams between the movable panels and adjacent enclosure structure but such seals are gravity dependent and, accordingly, are operative only along those seams that are horizontally disposed, such as adjacent the top or bottom edges of the movable panels. Their use to seal the vertically disposed seams as exist between the facing ends of the movable panels when they are closed and between the remote ends of the panel and the adjacent enclosure wall structure is technically unfeasible.

It has also been contemplated to seal openings in converter enclosure structures by means of what is commonly termed an "air curtain" as shown in U.S. Pat. No. 3,724,827 to A. T. Dortenzo, but the use of such seals is possible only in a region of the enclosure that is not subject to high intensity gas discharges. Their use in the region of the enclosure charging doors is impractical especially when the enclosed converter is of the "bottom-blown" type since this region of the enclosure is oftentimes subject to impingement by high velocity gas discharge, as for example, when the open top of the vessel is rotated into facing relation with the doors during metal sampling stages of the process. "Air curtain" seals are otherwise undesirable in converter enclosure applications due to the fact that the amount of air flow required to effectively seal the enclosure openings must be of such magnitude as to require the use of fans having extremely high capacity with a concomitantly high operating expense.

It is accordingly to the solution of the abovementioned problems that the present invention is directed.

SUMMARY OF THE INVENTION

In accordance with the present invention there is provided in combination with a movable panel covering an opening in a gas containment structure, means for sealing the interface between the edge of the panel and the edge of the adjacent structure when the panel is in closed relation with respect to the opening against the flow of effluent from the enclosure interior to the exterior thereof comprising baffle means coextensive with the interface to be sealed between the adjacent edges of said panel and adjacent structure defining a plenum having separate passage means extending to the interior of the enclosure and to the exterior thereof respectively; fan means connecting with said plenum at the end opposite that connecting said passage means operative to effect a flow of fluid through said passage and said plenum.

In its preferred form the invention contemplates the use of forced draft fan means whereby clean atmospheric air is forced through the plenum to be discharged from the ends of the two passages whereby the egress of contaminated fluid from the interior of the enclosure to the atmosphere is prevented. Alternatively, however, the invention contemplates use of an induced draft fan means connected at its discharge end to contaminated fluid disposal means whereby the fan is operative to induce the flow of contaminated effluent into the plenum from the end of one passage and atmospheric air from the end of the other passage, thereby preventing the egress of contaminated fluid to the atmosphere.

According to an aspect of the invention baffle plates are arranged with respect of the facing edges of the movable panels to cooperate to form the respective passages when the panels are disposed in their closed position.

According to another aspect of the invention baffle plates arranged with respect to the remote side edges of the movable panels and the adjacent enclosure side walls to cooperate when the panels are in their closed position to form the passages.

For a better understanding of the invention, its operating advantages and the specific objectives obtained by its use, reference should be made to the accompanying drawings and description which relate to a preferred embodiment thereof.

DESCRIPTION OF A PREFERRED EMBODIMENT

Figure 1:
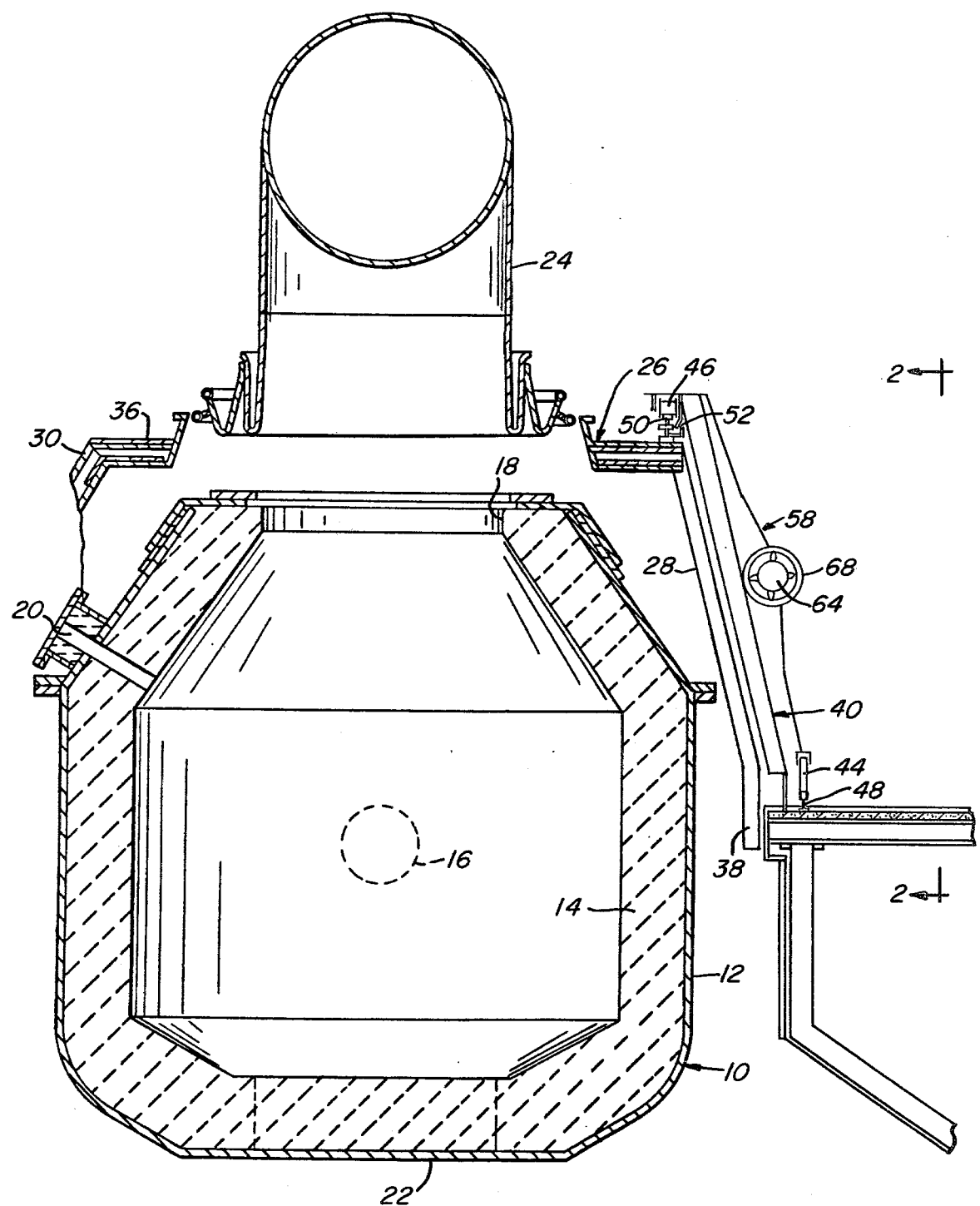
FIG. 1 is an elevational section of a metallurgical vessel having an enclosure incorporating the present invention.

FIG. 1 of the drawing illustrates a metallurgical converter vessel 10 in which molten metal is refined. Those skilled in the art will appreciate that the vessel may be adapted for the refinement of steel by the basic oxygen process, by the Q-BOP process or by the argon-oxygen process.

The vessel 10 comprises a sheet metal shell 12 lined with refractory material 14 and is rotatably mounted about a horizontal axis formed by a trunnion pin 16. The vessel 10 contains an opening 18 at its upper end for the receipt of charge material and a tapping spout 20 that communicates with the vessel interior in the upper region thereof.

In practice the vessel 10 as viewed in FIG. 1 can be rotated to the right for the reception of molten or solid charge material through the opening 18, then rotated back to the position shown in FIG. 1 for the conduct of the refining process. The vessel 10 is tapped by being rotated in a direction opposite to that for charging whereupon the molten product is discharged from the tapping spout 20 into a receiving vessel, such as a ladle, or the like (not shown).

The refining operation entails blowing oxygen and other refining elements into the molten bath contained in the vessel. In the basic oxygen process the refining gas is supplied through an elongated lance (not shown) that extends into the vessel interior through the opening 18. In the Q-BOP process the refining gas is supplied through tuyeres (not shown) that penetrate the vessel bottom 22 and in the argon-oxygen process the gas is supplied through tuyeres (not shown) that penetrate the lower region of the vessel.

In all cases, large volumes of effluent gases containing various impurities are emitted from the vessel opening 18. These impurities are captured by a hood 24 and conducted through various cleansing operations before being discharged to the atmosphere. In the practice of the Q-BOP process particularly, the converter vessel 10 is preferably enclosed by a containment structure 26, commonly termed a "dog house". The structure 26 includes rectangularly disposed front, rear and opposed side walls, indicated as 28, 30, 32 and 34 respectively. The top of the structure is closed by a roof 36 adapted to receive the hood 24.

Figure 2:
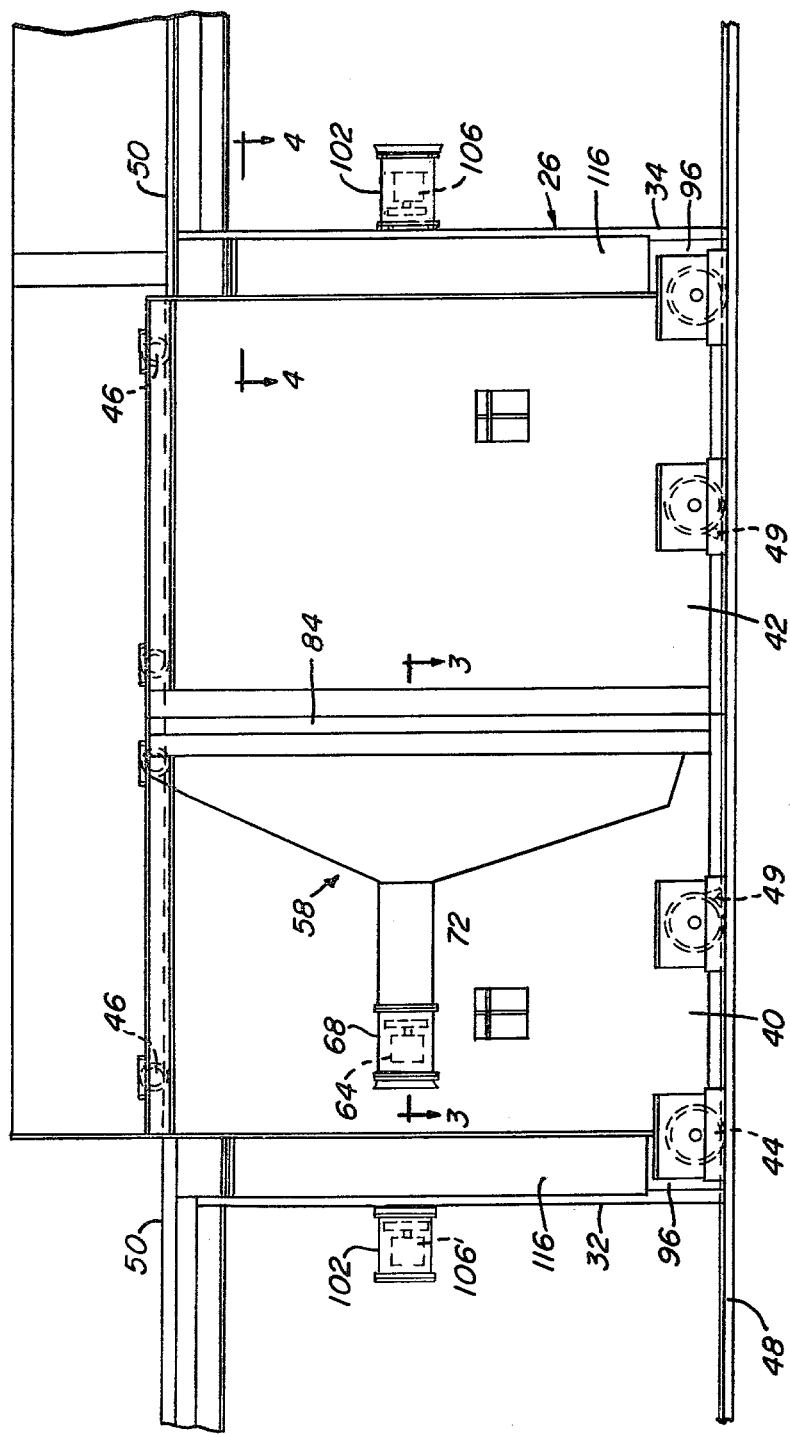
FIG. 2 is a view taken along line 2—2 of FIG. 1.

The front wall 28 contains an access opening 38 that is adapted to accommodate the passage of charge materials through the vessel opening 18 when the vessel is rotated into its charging position. The access opening 38 is closed by movable inclined doors 40 and 42 that extend in side-by-side relation across the opening 38 when in their closed position and which are oppositely movable toward and away from each other between their opened and closed positions. As shown in FIG. 2 the doors 40 and 42 are provided with wheels 44, 46 to facilitate their movement. Wheels 44 are disposed at spaced locations along the bottom of each door and engage floor-mounted rails 48. Door limit stops 49 are attached to the rails 48 in order to place the facing edges of the doors 40, 42 in slightly spaced relation when in their closed position for reasons hereinafter described. Wheels 46 are similarly spaced along the top of each door and move in tracks 50 that extend across the adjacent edge of the enclosure roof 36. An appropriate sand or liquid seal such as indicated as 52 may be provided to seal the upper horizontal seam between the doors 40, 42 and the adjacent enclosure structure.

Figure 3:
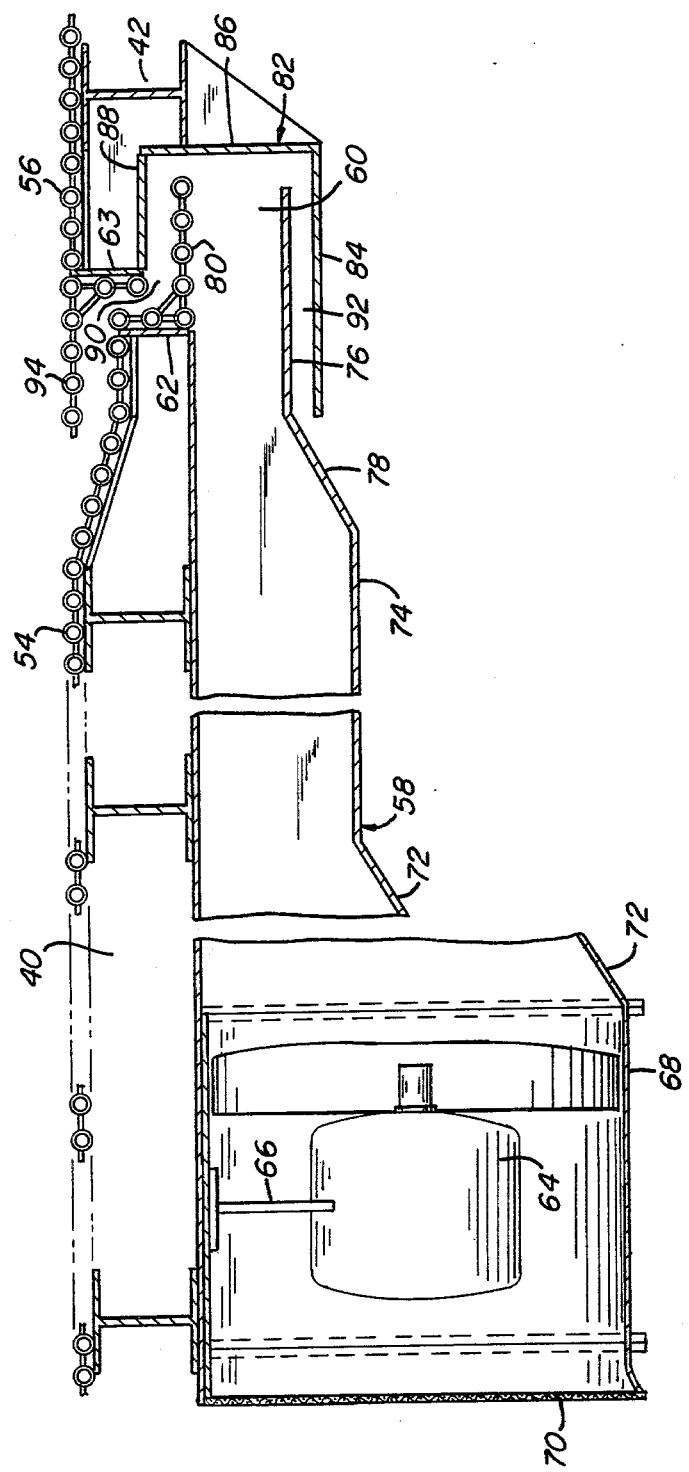
FIG. 3 is a sectional view taken along line 3—3 of FIG. 2.

As is common practice and as shown in FIG. 3 the interior surface of the respective doors 40, 42 are lined with fluid conducting tubular panels 54 and 56 constructed of a plurality of parallel tubes weldedly connected by intermediate metal bars. It is the function of these panels to protect the doors against the radiant effects of the molten bath contained in the vessel 10, especially when the vessel may be in a rotated or partially rotated position facing the doors.

According to the present invention, air seal means are provided to prevent the escape of effluent gases from the vessel 10 through the seams between the facing edges of the doors 40 and 42 and between the opposite edges of the doors and the adjacent enclosure walls when the doors are in their closed position. The seal employed for sealing the facing side edges of the doors 40 and 42 comprise plate means attached to the door 40 defining an enlarged air flow duct, indicated generally as 58, that terminates in an air discharge opening 60 that is substantially coextensive with the door edge 62. Air flow to the opening 60 is supplied by a motor-driven axial-flow fan 64 that is attached to the exterior surface of the door 40 by a bracket 66. The plate means forming the duct 58 includes a generally cylindrical fan housing section 68 enclosing the fan 64 and defining an air inlet opening 70. Between the fan housing section 68 and the flow discharge opening 60 the duct 58 includes a transition section 72, a distribution plenum 74 and a velocity nozzle section 76 that communicates with the distribution plenum 74 via a constriction 78. As shown in FIG. 3 the terminus of the velocity nozzle section 76 facing the interior of the enclosure is formed by an extension 80 of the tubular panel.

The door 42 mounts adjacent its facing edge 63 plate means 82 that are coextensive with the door edge and that telescopically receive the leading end of the duct 58 defined by the velocity nozzle section 76 thereof. The plate means 82 includes plates 84, 86 and 88 that are disposed at right angles with respect to one another defining, when the doors 40 and 42 are in their closed positions, a U-shaped receptacle for the leading end of the duct 58 defined by the velocity nozzle section 76 thereof.

It will be appreciated that, in the practice of the invention with door limit stops 49 on the rails 48 locating the facing edges 62 and 63 of the doors 40 and 42 in slightly spaced relation as shown in FIG. 3; the plates 84, 86, 88 cooperate with the leading end of the duct 58 to form oppositely directed passages 90 and 92 from the air discharge opening 60 of the duct, the passage 90 communicating with the interior of the enclosure and passage 92 communicating with the exterior thereof. The passages 90 and 92 are dimensioned with respect to the flow area of the duct 58 to provide a positive flow of air simultaneously through both passages thereby preventing the egress of effluent from the enclosure interior to the atmosphere.

As shown in FIG. 3 the door 42 adjacent its facing end 63 contains an extension 94 of the tubular panel. This extension, together with that indicated as 80 on the door 40, cooperate to provide a physical barrier against the expulsion of flame or effluent from the enclosure that may be occasioned during instantaneous "puffs" or process excursions.

In the operation of the described arrangement the fan 64 is operated upon closure of the doors 40 and 42 to create a flow of atmospheric air through the duct 58 and discharging from the distribution plenum 74 simultaneously through the passages 90 and 92. The fluid pressure of the air in the plenum 74 being maintained at a level greater than that within the gas containment enclosure creates an air flow through the passages that prevents the flow of effluent exteriorly of the enclosure.

Figure 4:
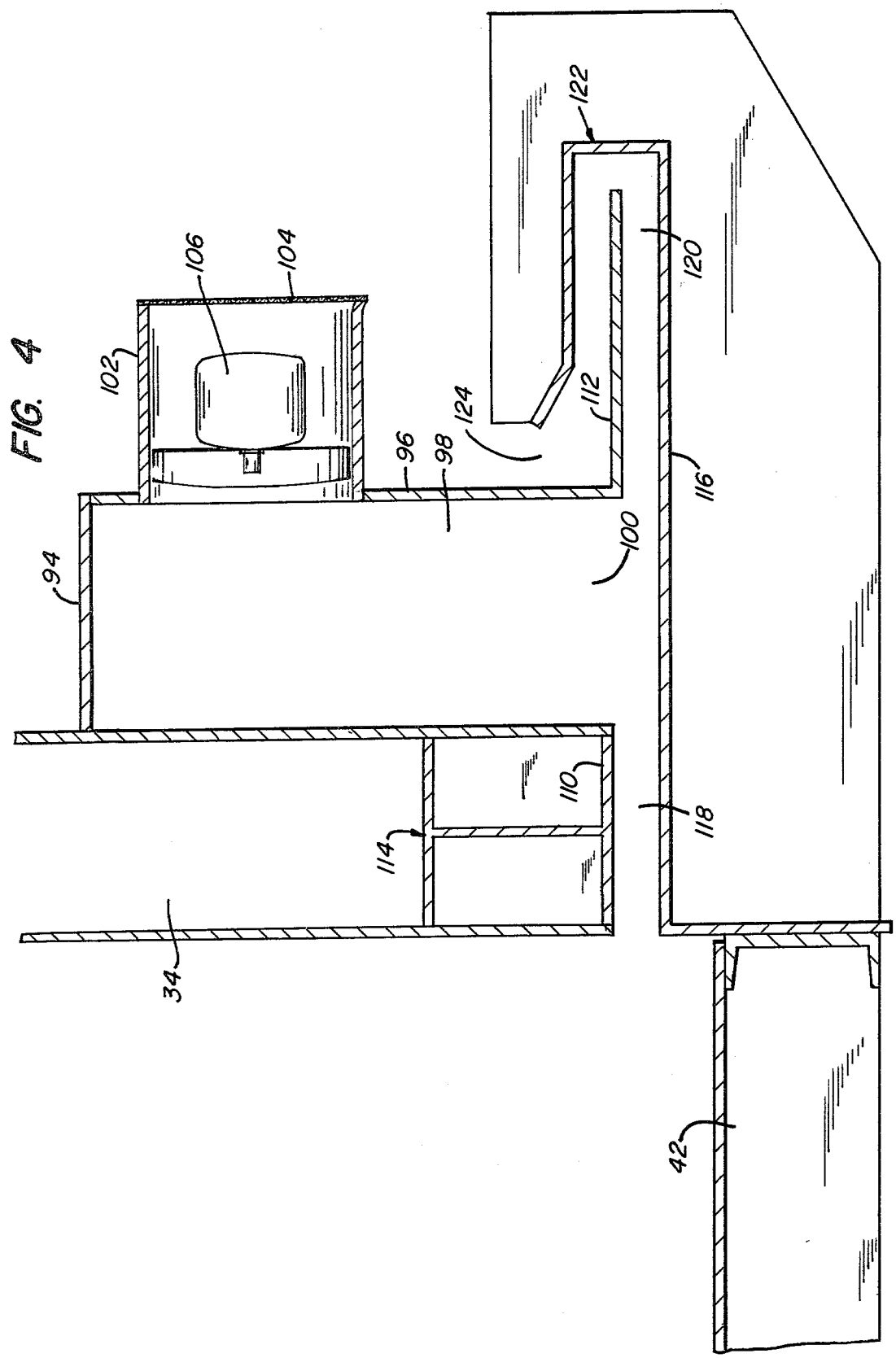
FIG. 4 is a sectional view taken along line 4—4 of FIG. 2.

FIG. 4 illustrates the air seal arrangement provided along the vertical seam between the remote end of the door 42 and the adjacent enclosure side wall 34. It will be appreciated that the seal between the remote end of door 40 and the adjacent enclosure side wall 32 is of identical but reverse construction from that illustrated in FIG. 4.

As shown, the enclosure side wall 34 attaches rectangularly disposed plates 94 and 96 defining a box manifold 98 that extends throughout the height of the door 42. The front end of the manifold is open at 100 and its top and bottom ends are closed by end plates (not shown). A cylindrical fan housing 102 having an air inlet opening 104 is attached to the plate 96 at a height intermediate the ends of the manifold and mounts an axial flow motor driven fan 106. An opening 108 in the plate 96 effects communication of the fan housing 102 with the manifold 98. Plate members 110 and 112 extend in opposite directions from the open end of the manifold, member 110, being here shown as a flange on support member 114, extends from the manifold opening 100 to the enclosure interior, while member 112 extends outwardly from the opening. Mounted on the end of the door 42 is a gusset-stiffened plate 116 that is coextensive with the height of the manifold 98 and which is disposed in spaced relation from the plate members 110 and 112. The plate 116 cooperates with the members 110 and 112 to define oppositely-extending passages 118 and 120, the former leading to the enclosure interior and the latter leading to atmosphere. The free end of the plate 116 is U-shaped as shown at 122 forming a receptacle for the member 112 and serving to render the passage 120 tortuous before opening to the atmosphere at 124.

The operation of the thus described seal arrangement is substantially the same as that provided at the interface between the doors 40 and 42, in that upon closure of the doors 40 and 42 the fans 106 at both sides of the enclosure are placed in operation. Air at an elevated pressure is forced from the atmosphere into the manifold 98 from whence it flows simultaneously through passages 118 and 120 thereby sealing the passages against the egress of converter effluent.

Although the invention, in its preferred aspect, employs forced draft fans as described herein it is contemplated that in special applications, as for example, when it may be desirable to collect the effluent in a receiver, that the described forced draft fans can be replaced by induced draft fans whereupon the fluid pressures maintained in the duct 58 and in the manifold 98 respectively will be below atmospheric and below the ambient pressure in the enclosure to effect flows through the several flow passages in the reverse direction from the flows described hereinabove. In such applications appropriate gas collecting means will be connected to the respective fan housings 68 and 102 for reception of the effluent induced through the passages. The effectiveness of the seals against leakage to the atmosphere in such alternative arrangement will be nonetheless maintained since the openings to the atmosphere defined by the ends of passage 92 in the seal arrangement of FIG. 3 and the passage 120 in the seal arrangement of FIG. 4 are subject to an ingress of atmospheric air. Effluent leakage to the atmosphere is thereby precluded.

It will be appreciated that the arrangement described herein provides an effective seal against effluent leakage along the seams of movable doors in a converter enclosure subject to the most adverse operating conditions. Because the members that establish the seal are maintained in spaced relation from one another in order to define the respective air flow passages it is evident that these members can tolerate significant amounts of deformation either as a result of thermally-induced warpage or due to physical abuse without reducing the effectiveness of the seal.

It will be understood that various changes in the details, materials and arrangements of parts which have been herein described and illustrated in order to explain the nature of the invention, may be made by those skilled in the art within the principle and scope of the invention as expressed in the appended claims.

We claim:

1. In a metallurgical vessel enclosure having an access opening in an upstanding wall thereof, the combination of:
    (a) at least one wall member being movable with respect to said access opening and being sized to extend across said access opening when in its closed position;
    (b) said movable wall member having a generally vertical end cooperable with the facing end of an adjacent wall member and defining a seam therebetween when said movable wall member is in its closed position;
    (c) stop means operative to locate said movable wall member in its closed position in spaced relation from said facing end of said adjacent wall member along said seam; and
    (d) means for sealing the space defining said seam against the flow of effluent from said vessel enclosure, said sealing means comprising:
        (i) means on one of said wall ends forming a fluid conductor having a vertically elongated terminous adjacent said one wall end and substantially coextensive therewith, said terminous being open for the flow of fluid therethrough,
        (ii) vertically elongated plate means on the other of said wall ends substantially coextensive with said fluid conductor terminous, said plate means being mutually angularly disposed to define a receptacle for receiving the end of said fluid conductor containing said terminous opening when said movable wall member is in its closed position, the sides of said receptacle defined by said plate means being spaced from said fluid conductor and cooperating therewith to form labyrinthine fluid flow paths coextensive with said terminous and oppositely directed from said receptacle into fluid communication with the interior of said vessel enclosure and with the exterior thereof, and
        (iii) fan means connected with said fluid conductor to effect a flow of fluid through said flow paths and said fluid conductor.

2. Apparatus according to claim 13 in which said fan means comprises a forced draft fan for maintaining the fluid pressure in said fluid conductor at a level above atmospheric and above that within the enclosure interior whereby fluid flow from said fan is forced through said fluid flow paths to the enclosure interior and to the exterior thereof respectively.

3. Apparatus according to claim 1 in which said fan means comprises an induced draft fan for maintaining the fluid pressure in said fluid conductor at a level below atmospheric and below that within the closure interior whereby fluid flow is induced through said fluid flow paths from said enclosure interior and from the exterior thereof into said plenum for discharge to a receiver.

4. Apparatus according to claim 1 in which the end of said movable panel is in interface relation with the end of an adjacent enclosure side wall and in which the means forming said fluid conductor include:
   (a) means defining a manifold in fixed relation to said enclosure side wall;
   (b) a baffle plate attached to said movable panel edge defining a receptacle; and
   (c) said manifold containing oppositely extending plate means in spaced relation to said baffle plate and cooperating therewith to define passage means extending from said manifold to said enclosure interior and to said enclosure exterior respectively.

5. Apparatus according to claim 1 in which said fan means is mounted on said one wall member.

6. Apparatus according to claim 5 in which both said one wall member and said adjacent wall member are mutually oppositely movable to cover said access opening.

* * * * *

UNITED STATES PATENT AND TRADEMARK OFFICE
CERTIFICATE OF CORRECTION

PATENT NO. : 4,264,061
DATED : April 28, 1981
INVENTOR(S) : James T. Stull and Robert V. McCabe It is certified that error appears in the above-identified patent and that said Letters Patent are hereby corrected as shown below:

Column 6, line 57, claim 2, change "13" to -- 1 --.

Signed and Sealed this

Eighteenth Day of August 1981

[SEAL]

Attest:

GERALD J. MOSSINGHOFF

Attesting Officer — Commissioner of Patents and Trademarks